INVENTORS
RICHARD F. JULIUS
RAYMOND K. CARNAHAN

INVENTOR
RICHARD F. JULIUS
RAYMOND K. CARNAHAN

United States Patent Office 3,156,412
Patented Nov. 10, 1964

3,156,412
REMOTE CONTROL SYSTEM FOR COMBINED ADDING MACHINE, TAX COMPUTER, AND COIN DISPENSER
Richard F. Julius, Silver Spring, Md., and Raymond K. Carnahan, Alexandria, Va., assignors to American Machine & Foundry Company, a corporation of New Jersey
Filed Aug. 11, 1961, Ser. No. 130,898
10 Claims. (Cl. 235—146)

This invention relates to business machines, and more particularly relates to a novel electric inventory, sales and cash control system for use in businesses and industries requiring inventory and cost controls.

This invention will be described with respect to a specific embodiment adapted particularly for use in cafeterias to keep accurate accounting of the prepared-food inventory, the operating cash account and the register sales account. However, the invention is equally applicable to other types of businesses, for instance by accounting for the extensive inventory in a bar while at the same time registering the sales receipts. Another possible use which does not involve direct sales to the customer is in laundries wherein the present system can be used to make up a list of the laundry items received according to type, at the same time entering the charge for each item to form a bill, which is then totaled, taxed and retotaled.

Returning to the embodiment suitable for cafeteria use, one principal problem which arises in a cafeteria is the difficulty of reconciling the prepared-food inventory accounts with the register sales account and the operating cash account. Some cafeterias have attempted to solve this problem by placing two operators in each cafeteria line in which the first operator keeps inventory records of the items on the customers' trays, and the second operator totals the cost of the items on the tray and accepts payment. This system is not only expensive, but still permits significant discrepancies between the three accounts mentioned above.

It is an important object of this invention to provide a register system which keeps account of every inventory item sold, automatically provides an infallible charge for each item, totals the amount for each bill, and keeps account of the cash actually received.

It is another important object of the invention to provide a machine which automatically figures the tax on the subtotaled items, obtains a new total, records the cash tendered by the customer, and then figures and displays the correct amount of change due the customer. As a corollary to this object, the machine also automatically dispenses the coinage and provides a display indicating the amount of change due the customer in bills.

Still another important object of this invention is to provide a system which keeps accurate account of each inventory item sold and displays the total inventory amount in a convenient manner so as to facilitate entry of the figures into the journal of the bookkeeper.

Another object of the invention is to provide a system in which the bookkeeper sets the machine up prior to each meal by labeling the keys of the item keyboard, and by adjusting a set of pricing switches associated with each key on the item keyboard, which switches determine the prices to be charged for the associated items represented by the keys, whereby the actuation of each key automatically determines and records the price to be charged for that associated item.

It is another important object of this invention to provide a machine having such simple controls that a single relatively unskilled operator can successfully use the machine since she does not have to memorize the prices of the various items being sold.

Still another important object of the invention is to provide a system which considerably increases the speed of processing each customer through the cafeteria line, the increased speed being accomplished by simplifying the operator's motions due to the fact that the system requires the operator only to press the various item keys representing the items on the tray, and then enter the amount of cash tendered on another cash keyboard, after which the machine figures the tax, the total bill, the amount of change due the customer, and actually delivers the coinage, leaving only the delivery of paper money to be performed by the operator of the machine.

Still another object of the invention is to provide a machine having means for totaling not only the quantity of each item sold, but also the grand total of sales for an interval of time selected, and also accumulating the total tax collected during that interval.

When used in a cafeteria, the operator sits behind the console which controls the present system and faces each customer approaching with his tray along the rail. When the tray is within view, the operator depresses one key on the item keyboard for each item on the tray, i.e. one key for a pork chop, one for peas, one for potatoes, one for coffee and one for pie. The keys are depressed sequentially, and as each key is depressed, the price of the item is printed on a paper tape in a window of the console. Simultaneously, the inventory is recorded on the associated item counter. The operator then depresses the "order bar" signifying that the entire order has been entered, and a subtotal for the check is printed on the tape, the State tax is automatically computed and printed, and then the total bill is printed on the tape. Next, the operator enters the amount of cash tendered by the customer on a cash keyboard which is separate from the item keyboard, and depresses the change bar, thereby causing the system to compute the correct change, print the change on the tape and automatically dispense the correct coinage using the minimum number of coins to reach this correct amount.

After each operating interval is completed, for instance after each meal is completed, the bookkeeper opens a panel of the console and exposes the digital counters which are each associated with a particular item key. The bookkeeper copies the total from each of these counters into his journal, thereby recording the number of servings of each specific menu sold during the meal. The item counters are then returned to zero position. Prior to each meal, a bookkeeper changes any menu item on the item keyboard to correspond with the menu for that meal, and adjusts the switches associated with each item key so as to set the prices charged for that menu item. Thereafter, the machine automatically enters the correct charges for the items on each customer's tray.

It is therefore a very important object of this invention to provide a business machine in which responsibility for prices of the items represented by the key on the item keyboard remains with the bookkeeper rather than with the cashier, and avoiding all necessity of training the cashier to be responsible for the prices charged for the various items on the customer's tray.

A further object of this invention is to provide a system in which the timed functioning of the various keys which can be depressed by the operator is automatically and accurately controlled by a group of relays so that electrical signals of proper duration are provided to the various adding-machine controlling solenoids to ensure proper operation of the solenoids while at the same time preventing damage thereto by currents of excessive duration in the event that an operator should hold a key in depressed position for a time longer than the time required to operate the associated solenoids.

A further object of the invention is to provide an automatic system in which the operating times are very brief, on the order of milliseconds so as not to slow down the rate at which the machine can process customers through the cafeteria line.

The present system also has considerable utility in connection with automatic order handling and dispensing of food, since it can be easily adapted for use either by the customer himself pressing the item keys representing the foods which he desires to order, or else by an operator who actually transmits the orders to the kitchen of a restaurant by pressing the item keys on the keyboard, the present system being especially useful in semi-automatic restaurants in which the customer pays for his food at the same time that he orders it.

Other uses, objects, and advantages of the present invention will become apparent during the following discussion of the drawings, wherein.

Figure 5:
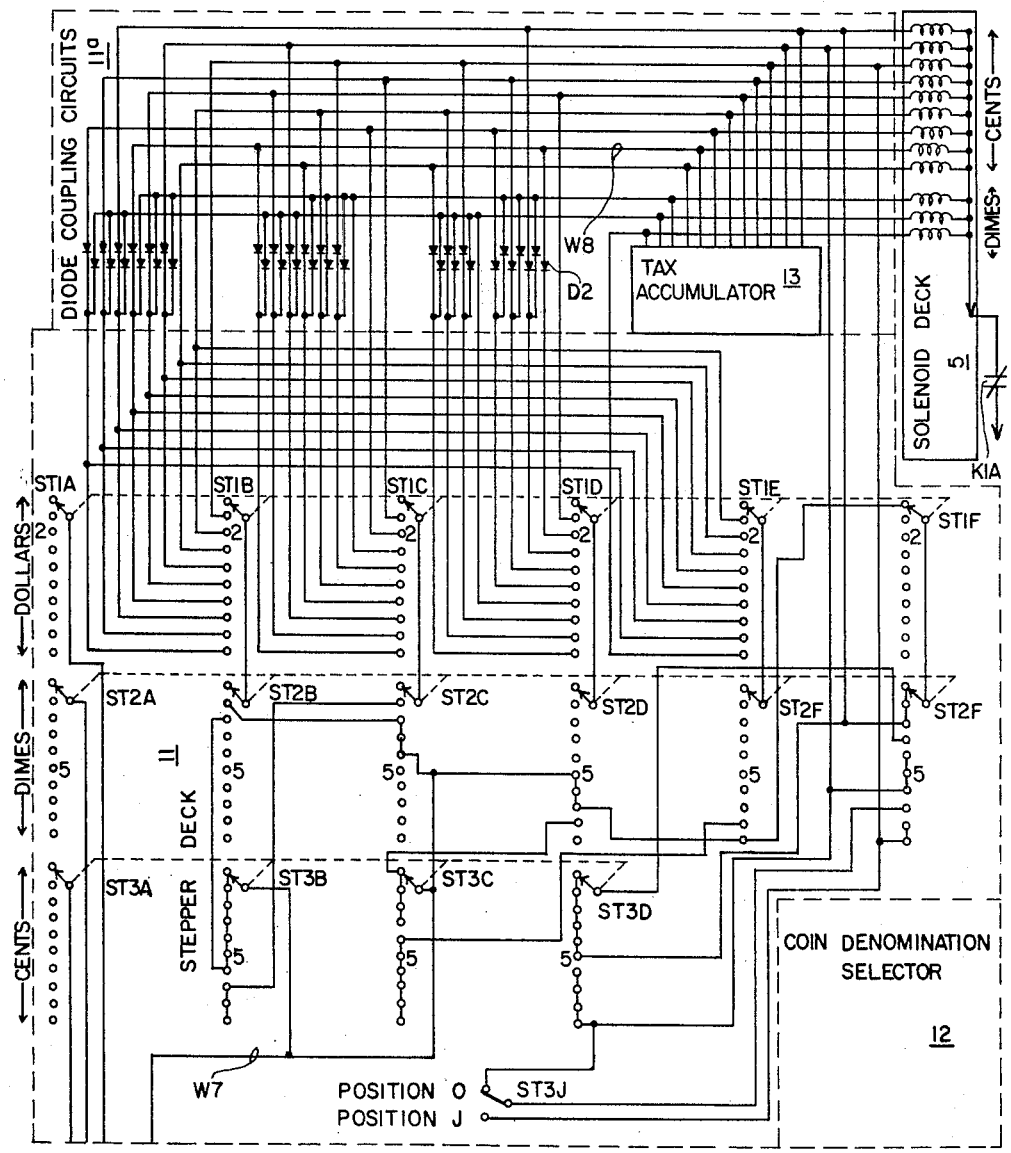
Figure 6:
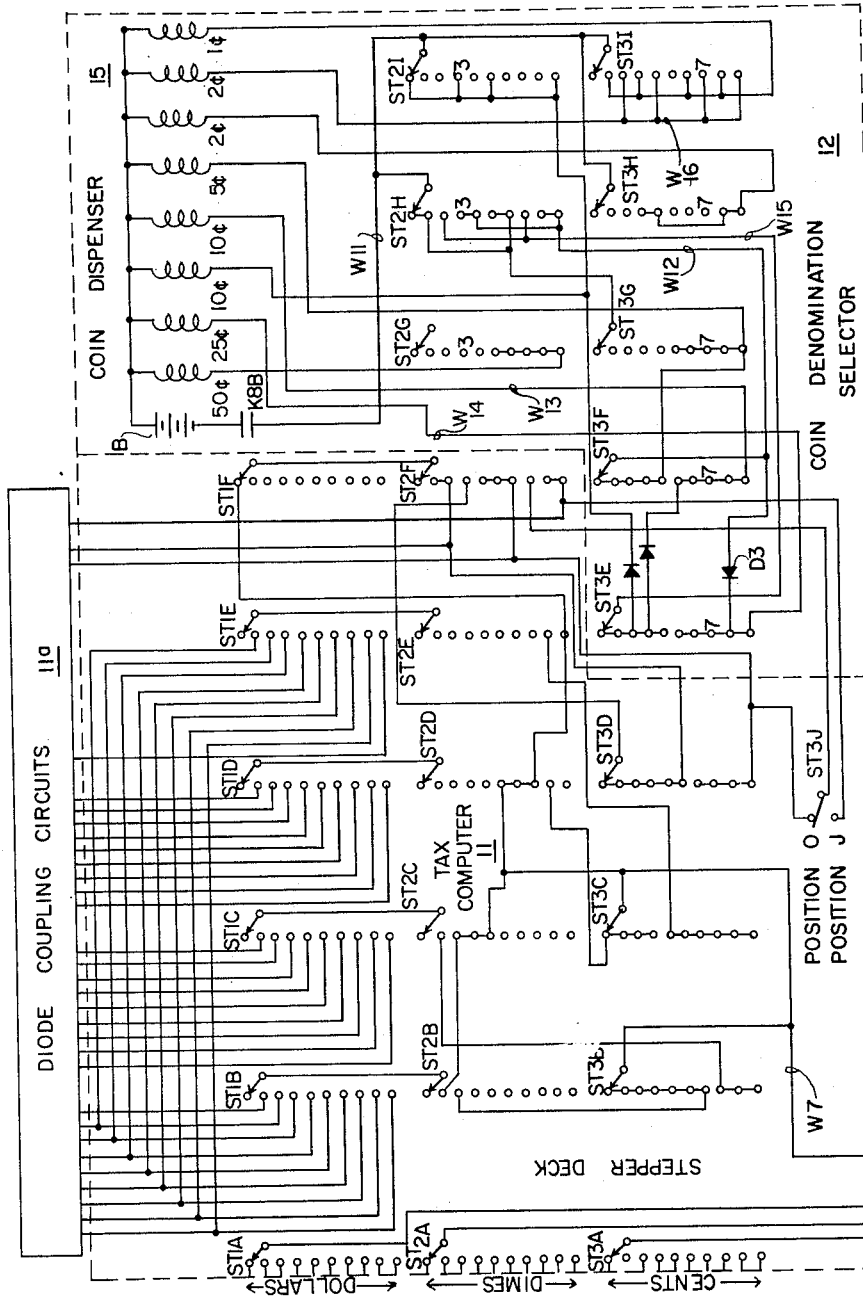

FIG. 5 shows another detailed view of the stepping relay means showing in greater detail the tax-computing circuits including diode coupling circuits by which the output of the stepping relay means is employed to make entries on the adding machine through a solenoid deck; and FIG. 6 is still another partial schematic of the system showing the complete stepping relay means serving both to compute taxes and also to control the dispensing of coinage in the proper denomination.

*General Operation*

Figure 1:
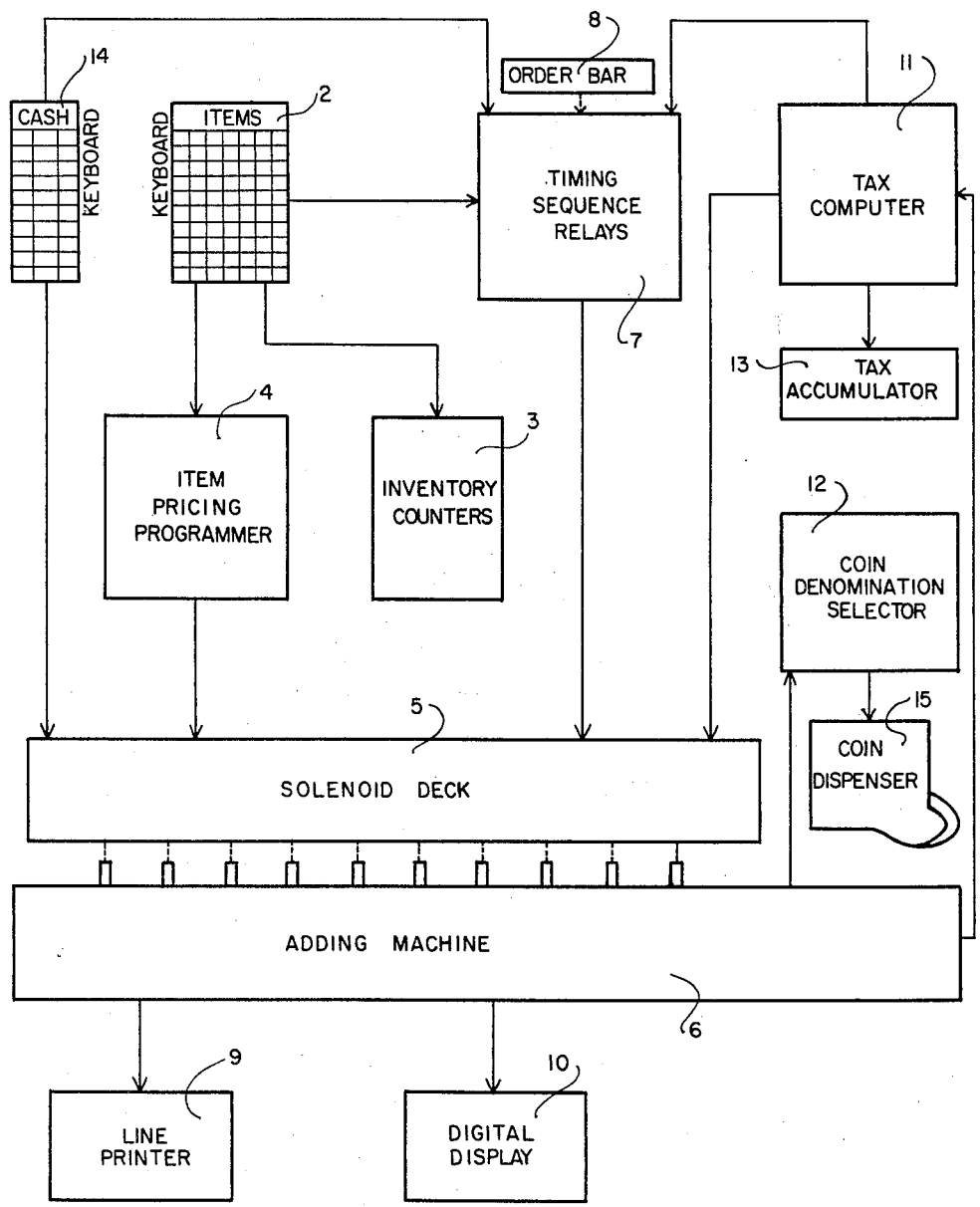
FIG. 1 is a block diagram showing the general combination of units of the present cash and inventory register system.

Referring now to the block diagram of FIG. 1, the present cash and inventory register system comprises an item keyboard 2 on which every key is labeled (not shown) with the name of a particular commodity or item to be sold, or processed in some other manner. For instance, when the present system is used at the end of a cafeteria line, the various keys on the item keyboard will represent the different foods available in the cafeteria line. As the customer reaches the end of the cafeteria line the operator sequentially presses the keys corresponding with the food items appearing on the customer's tray, and thereby enters in the system the items for which the customer is to be charged. As the appropriate keys on the item keyboard 2 are pressed, entries are automatically made in a system of inventory counters 3 so that at the end of the day the bookkeeper can read off the exact number of each item that was sold during the course of the day. In addition, each key is coupled to an item-pricing programmer 4 comprising a plurality of switches which can be preset and which convert each item entered on the item keyboard into a dollars-and-cents price. Thus, each time an item key is depressed upon the keyboard 2, the item-pricing programmer 4 actuates the appropriate solenoids in the solenoid deck 5, which solenoids automatically actuate the appropriate digital keys on the keyboard of a conventional adding machine 6. The particular adding machine used in the working embodiment of the present invention is National Cash Register Co. Model 31KN. A system of timing sequence relays 7 applies appropriate electrical pulses to the solenoid deck 5 in order to ensure that each solenoid will be energized for a sufficient length of time to actuate its function on the adding machine, but will not be energized for so long a time as to raise the possibility of overheating a solenoid. In other words, no matter how long a key is held down on the item keyboard, the corresponding solenoids are actuated for only a fixed interval of time and then released.

After a pluarity of items have been entered and their prices recorded on the adding machine by the solenoids, the operator then depresses an order bar 8 which indicates to the timing sequence relays that the customer's complete order has been entered.

In response to the depressing of the order bar 8, the timing sequence relays 7 set in progress a series of functions as follows: First, the adding machine subtotals the price of the items entered, at the completion of which function a signal from the adding machine initiates the function of a tax computer which automatically computes the tax on the subtotaled price and enters the tax upon the solenoid deck 5. The solenoid deck 5 then enters the tax on the adding machine and initiates the further function of the adding machine by which a new total is obtained comprising the sum of the food prices plus the tax. During this entire functioning, a line printer 9 has been entering the figures on a paper tape which forms a bill that is eventually handed to the customer, and the entered numbers are also displayed on a visual digital display 10.

The tax computer 11 comprises a series of stepping relays some of the circuits of which compute the tax, and others of the circuits comprise a coin denomination selector 12, the function of which will presently appear.

The block diagram of FIG. 1 also shows a tax accumulator 13 which merely keeps track of the entire amount of tax collected during the day so that the bookkeeper will know at a glance the amount of money which has been collected to be entered on the tax account.

When the adding machine has entered the total both of the items purchased and the tax, the customer then tenders an amount of cash, and the operator enters the amount of cash tendered on a cash keyboard 14. The entry of this amount of cash immediately actuates the solenoid deck 5 to enter the tendered cash on the adding machine, and this amount of cash is then automatically subtracted from the total of the food items plus tax. A negative difference is obtained, this negative difference representing the amount of change which is due the customer, and this amount of change is displayed on both the line printer 9 and the digital display 10. As stated above, the coin denomination selector 12 comprises a series of decks on the same stepping relays as the tax computer. These stepping relays are stepped around until they register said negative difference, representing the change due the customer, which amount is thus entered on the stepper decks comprising the coin denomination selector 12. The wiring of these stepper decks determines, according to the positions of the steppers, the denominations of the minimum number of coins which can be dispensed in order to make proper coinage change, and a switch controlled by the operator then actuates the coin dispenser 15 to dispense the proper coinage to the customer. The necessary paper money to complete the change to the customer can then be dispensed either manually or by other automatic means (not shown).

Cumulative register means is also provided as a part of said purchased adding machine for indicating a grand total at the end of an appropriate service period, such as the end of a breakfast period, or a luncheon period or a dinner period, representing the total sales made during that period. In addition, the inventory counter 3 also includes a separate counting device which counts the number of transactions entered during said service period, or the number of customers whose trays were totalized. Each time the order bar 8 is depressed the transaction counter is advanced one position. Furthermore, a manual switch is provided whereby the operator can enter on the counter additional people in cases where there are several people in a group all of whom are to be included on a single check. The exact circuits by which the above functions are accomplished will be described in connection with the schematic diagram of FIG. 2.

*Item Entering and Pricing*

Figure 2:
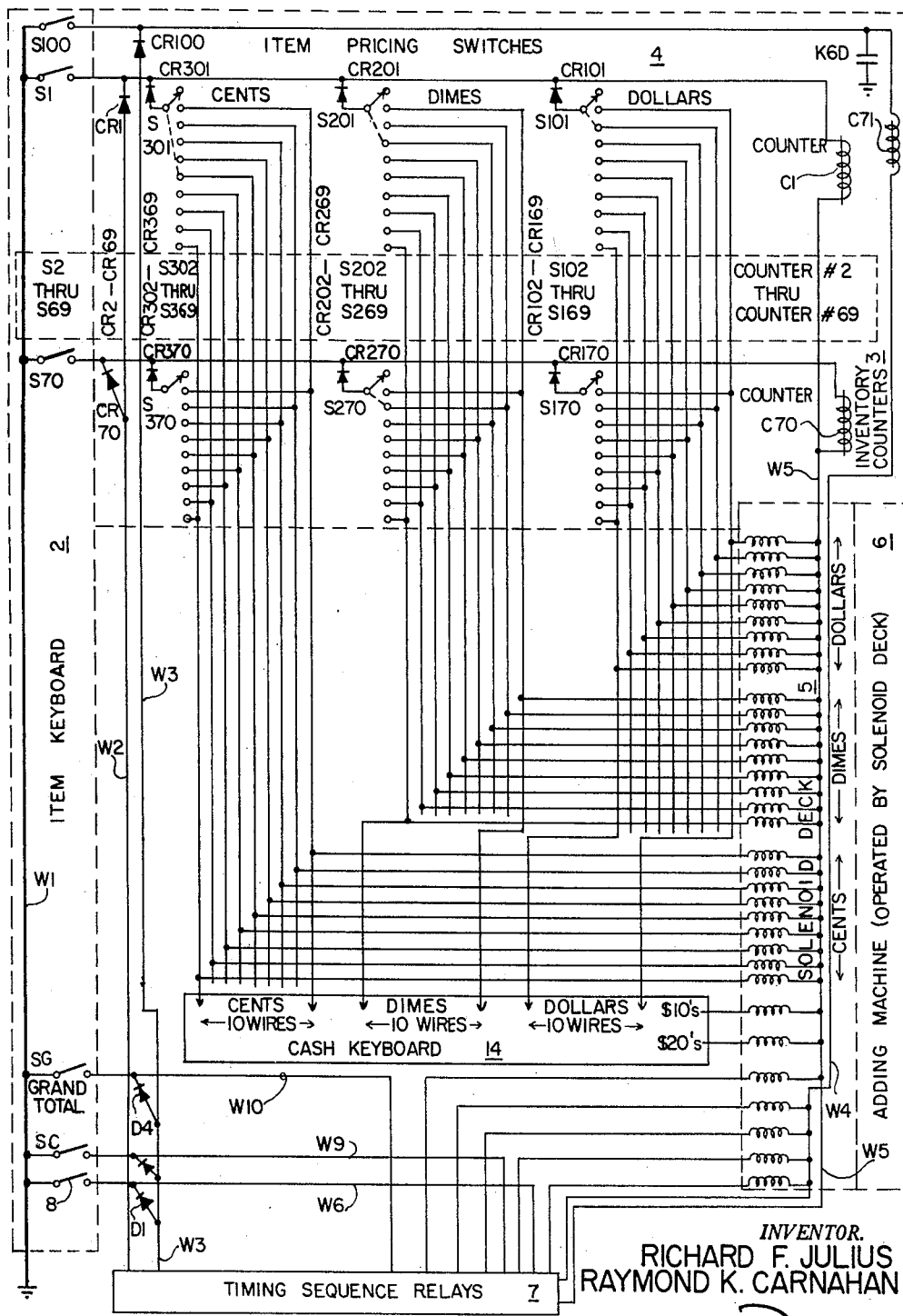
FIG. 2 is a partial schematic diagram of the system showing in detail two of the 70-item key circuits connected to item-pricing switches which in turn are coupled to a solenoid deck which enters prices in an adding machine according to the commodity keys which have been depressed on the item keyboard.

Referring now to the partial schematic diagram of FIG. 2, the 70-item keyboard 2 shown in FIG. 1 is represented by only two keys on the schematic diagram of FIG. 2, key S1 being the first of the keys and key S70 being the last of the keys. The enclosed zone extending in dotted lines across FIG. 2 between the keys S1 and S70 is intended to represent keys S2 through S69 and the accompanying circuits which are the same as the circuits associated with switches S1 and S70. Each of the key switches S1 to S70 on the item keyboard 2 is connected with three wipers of three associated item-pricing switches, the lead from switch S1 on the keyboard 2 being connected to the wiper of the switches S101, S201, and S301 on the item-pricing switch assembly 4, these connections being effected through coupling diodes CR101, CR201, and CR301 respectively. The wire coming from the key S1 also goes to the counter C1, which comprises a simple solenoid-actuated digital counter which simply counts the number of times the item corresponding with switch key S1 is selected. There are 70 such counters C1 through C70, inclusive, although only two of them are shown in FIG. 2. These counters serve the purpose of keeping a complete inventory of all items actually purchased by customers. For instance, if the key S1 represents coffee, and the key S70 represents doughnuts, the counters C1 and C70 keep track of the total numbers of both of these items sold during a service period. As in the case of key S1, key S70 is coupled to the wipers of pricing switches S170, S270, and S370 through diodes CR170, CR270, and CR370, respectively.

The item-pricing switches are manually preset to convert the items selected into equivalent dollar-and-cents prices. For instance, although all of the item-pricing switches are shown in solid lines in the zero position, alternate positions of the switches are shown in dotted line for the top row of item switches. For instance, switch S101 is shown by dashed lines in position 2, switch S201 is shown in dashed lines in position 3, and switch S301 is shown by dashed lines in position 5, this particular row of pricing switches representing a charge of $2.35. Although items in a cafeteria line would not be expected to be represented by so large a single charge, the item represented by this setting of pricing switches corresponding with switch S1 on the item keyboard could be a complete dinner for $2.35.

The left side of switch S1, the first key on the item keyboard 2, is connected to the negative, or ground wire W1, whereby when the key S1 is depressed the ground wire W1 becomes connected with the diodes CR101, CR201, and CR301 and grounds the positions 2, 3, and 5 in the dollars, dimes, and cents columns, respectively. Thus, on the solenoid deck 5 the left side of solenoid 5 in the cents bank of relays is connected to ground. Likewise, the third solenoid in the dimes group is connected to ground, and the second solenoid in the dollars group is connected to ground.

The right ends of the solenoids are connected to another wire W5, and when this wire is connected to the positive terminal of the power supply, the solenoids representing a charge of $2.35 are all simultaneously actuated and the corresponding keys of the adding machine are punched thereby. The manner in which the wire W5 is connected with the positive terminal of the power supply by the timing sequence relays 7 will be discussed in detail in connection with FIG. 3.

In connection with actuating the item key switch S70 in FIG. 2, it will be noted that the last row of item-pricing switches S170, S270, and S370 are set up to enter a total charge of 20¢ each time the 70th key is depressed. In other words, S170 is on zero, S270 is on 2, and S370 is also on zero. Thus, whenever the switch S70 is depressed only the second solenoid in the dimes group of the solenoid deck 5 has its left end connected to ground through diode CR270, and no current can flow through diodes CR170 and CR370 because of the fact that the switches to which they are attached are in the zero positions. Moreover, when the item key switch S70 is closed, the upper end of the inventory counter C70 is also connected to ground, the lower end of this counter winding being likewise connected with the wire W5 so that when the latter is connected by the timing sequence relays to the positive terminal of the power supply, the inventory counter C70 will be advanced one position.

Referring now to both FIGS. 2 and 3, the manner in which the right ends of the solenoids in the solenoid deck 5 are connected by the wire W5 to the positive terminal of the power supply is as follows: Whenever the #1 key on the item keyboard 2 is depressed, thereby closing switch S1, the diode CR1 couples the wire W2 to ground, and by inspection of FIG. 3 it will be seen that the wire W2 is connected to the upper end of the winding of a relay K1, the lower end of which is coupled directly to the positive terminal of the power supply. Thus, when S1 is closed the winding of the relay K1 is energized by connection of the upper end thereof to the ground wire W1 through the diode CR1. The relay K1, however, does not close instantaneously, but has a built-in 50-millisecond delay so that it closes only after this delay. When the relay K1 closes all of the associated contacts are also actuated, and among these contacts is the normally closed contact K1A. Through this contact, the right ends of the solenoids on the solenoid deck 5 have been normally connected to the positive terminal of the power supply, but when the relay contacts K1A open, this connection is broken. In other words, the switch S1 immediately energized the fifth solenoid in the cents group, the third solenoid in the dimes group, and the second in the dollars group on the solenoid deck 5, and these solenoids remained energized for 50 milliseconds and then were de-energized by the opening of the contacts K1A when delay relay K1 operated at the end of its 50-millisecond delay. Thus, the danger of overheating the solenoids on the solenoid deck 5 is averted by the breaking of the normally-closed contact K1A 50-milliseconds after any item key switch S1–S70 is closed, the coupling from these key switches to relay K1 being had through diodes CR1 through CR70, only the last one of which is illustrated in FIG. 2.

When the delay relay K1 is actuated in the manner set forth above, all of the other K1 contacts are likewise actuated, for instance K1B and K1C are closed. The closing of K1B grounds the upper end of relay winding K11 through normally-closed contact K9A, and when K11 is actuated it closed normally-open contact K11A thereby grounding the left end of the "add" solenoid on solenoid deck 5, the circuit of which is completed to the positive power terminal through normally-closed contact K2A. Therefore, the charge of $2.35 which was punched on the adding machine 6 is now added by the adding machine in response to the energizing of the "add" solenoid to whatever charges previously appeared thereon. Note that this "add" solenoid is automatically actuated in the above-described manner after the pressing of any item key and the accompanying closing of a switch S1 through S70, and that this sequence of events is automatically initiated by the timing sequence relays 7.

Next, suppose that the operator presses the last item key and thereby closes switch S70. By this action the second solenoid in the dimes group of the solenoid deck 5 is closed to enter a charge of 20¢, and at the same time a circuit is completed through diode CR70 and wire W2 to close the relay K1 after its 50-millisecond delay and thereby again open the normally-closed contact K1A to break the current through the second solenoid in the dimes group after an interval of 50 milliseconds.

When the relay K1 is actuated at the end of the 50 milliseconds, it also closes normally-open contact K1B to actuate the relay K11 and the "add" solenoid, and in addition closes the contact K1C, and thereby connects the upper end of the winding of the relay K2 to ground, thereby energizing this winding. However, the relay K2 is also a 50-millisecond delay relay, and therefore its contact K2A is not opened until the end of a 50-millisecond waiting period. At the end of this time normally-closed contact K2A is opened and disconnects the right sides of the "add," "subtract," "total," and "subtotal" solenoids, thereby permitting them to reopen.

Recapitulating, whenever an item key is depressed, the appropriate adding-machine-actuating solenoids are immediately energized and also current is applied to the winding of the relay K1. After 50 milliseconds this relay closes, thereby breaking the circuits at the contacts K1A to the right ends of these solenoids on the solenoid deck and also actuating relay K11 to operate the "add" solenoid on the solenoid deck 5. Actuation of the relay K1 also applies current to the 50-millisecond delay relay K2 which after its waiting period opens the normally-closed contacts K2A and thereby releases the "add" solenoid. Thus, two charges respectively of $2.35 and 20¢ have been entered and added on the adding machine. Assuming that the order is now complete, the operator of the machine depresses the Order Bar switch 8 thereby grounding the wire W6. As can be seen in FIG. 3, grounding of the wire W6 grounds the upper end of the "subtotal" relay K14, thereby closing contacts K14A and energizing the "subtotal" solenoid on the solenoid deck. At this point the adding machine performs a subtotal function to obtain a subtotal of $2.55 which is then displayed on the digital display 10 and printed on a tape by the line printer 9 which is actually a part of the purchased adding machine 6.

The closing of the Order Bar switch 8 and the grounding of the wire W6 also connects the wire W3 to ground through the diode D1 in FIG. 2. Grounding of the wire W3 again actuates the delay relay K2 which waits for an interval of 50 milliseconds, and then operates to open the contact K2A to thereby break the path to the right ends of the "subtotal" solenoid.

Stepping Relay Computers

Figure 3:
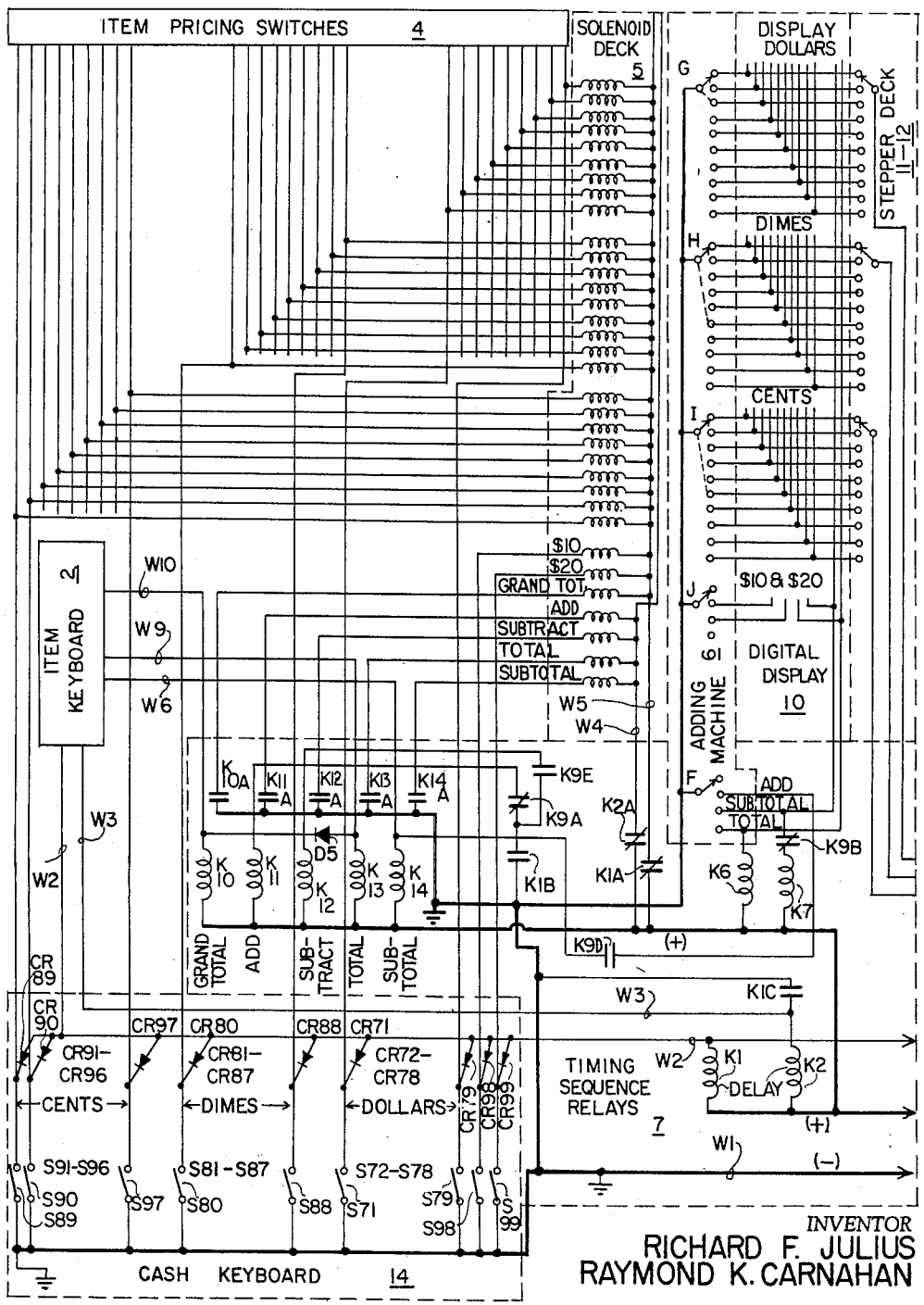
FIG. 3 is a partial schematic diagram of the system particularly showing several circuits of the cash keyboard also connected to the same solenoid means for controlling the adding machine, and further showing in detail timing relay circuits serving to time the various functions of the keyboards and the solenoid deck.
Figure 4:
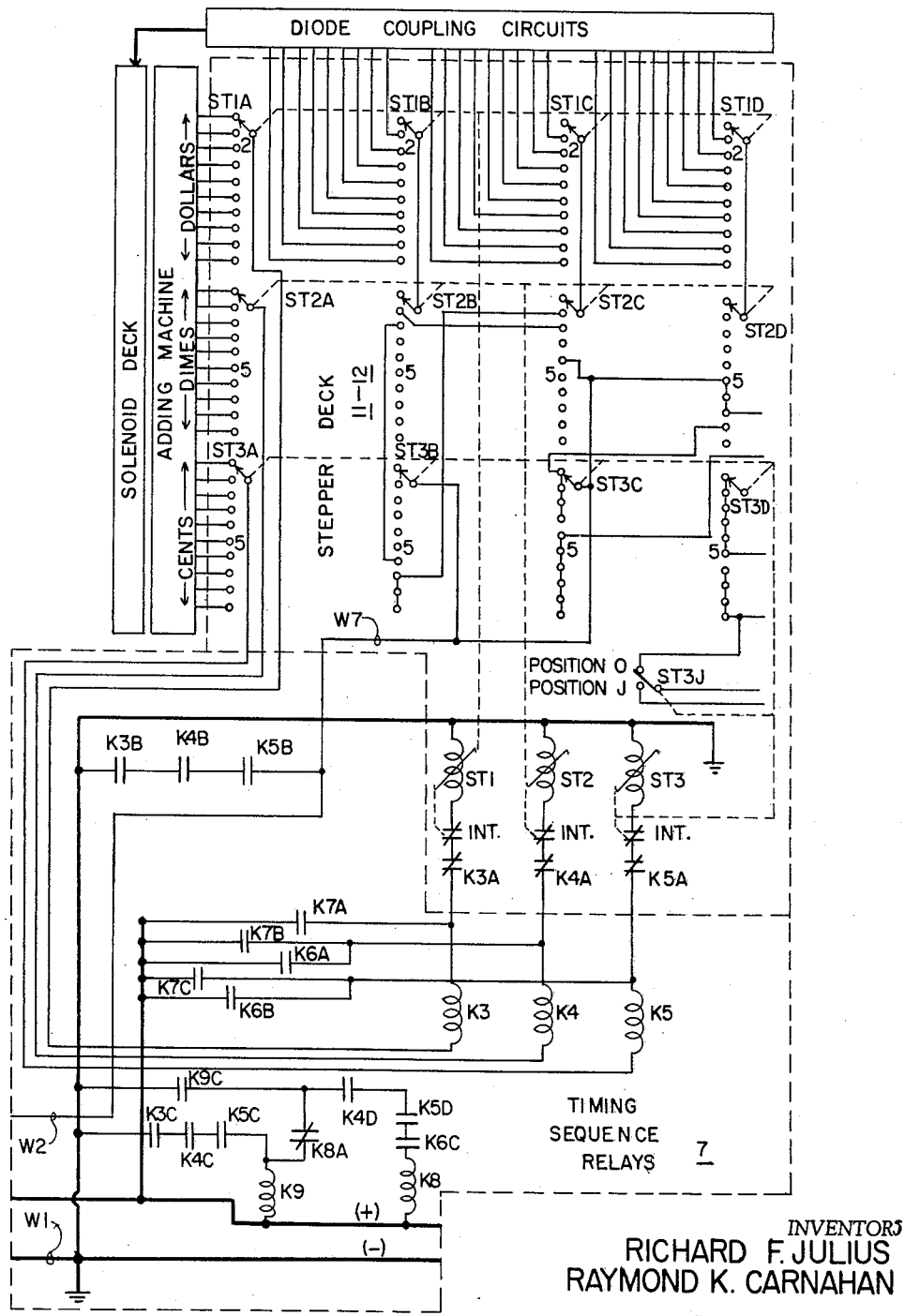
FIG. 4 is another partial schematic diagram showing stepping relay means for receiving the output of the adding machine and for converting it into useful functions including tax computations and coin denomination selections, the diagram also showing in detail the circuits by which the stepping relays are controlled.

Within the adding machine itself there is located a switch marked F in FIG. 3 which is actuated by the cycle of the adding machine and which closes in the position marked "subtotal." The wiper of this switch is coupled to ground and in turn grounds the upper end of the relay K7 through the normally-closed contacts K9B. This is another delay relay, and does not actuate immediately. However, when it does close, it closes the normally-open contacts K7A, K7B, and K5C of FIG. 4, thereby connecting the upper ends of the relays K3, K4, and K5 to the positive side of the power supply, the other ends of these windings being connected to stepper switches in a manner to be presently described. In addition, current is also applied through normally-closed contacts K3A, K4A, and K5A and through the normally-closed interrupter contacts of automatic stepping relays ST1, ST2, and ST3 so as to energize these latter three relays and begin them stepping sequentially in the manner to be presently described. The upper ends of the three stepping relay windings are connected to ground, FIG. 3. These stepping relays are automatically advanced from position to position by their own interrupter contact systems in a manner well known per se. These relays are purchased components and therefore do not themselves constitute novel structures for present purposes. The stepping relay ST1 moves the wipers in a plurality of switch decks ST1A, ST1B, ST1C, ST1D, ST1E, and ST1F, these decks being all ganged together as shown in FIGS. 4, 5, and 6. Likewise, the stepping relay ST2 operates in unison the wipers on decks ST2A, ST2B, ST2C, ST2D, ST2E, ST2F, ST2G, ST2H, and ST2I. The stepping relay ST3 comprises wiper decks ST3A, ST3B, ST3C, ST3D, ST3E, ST3F, ST3G, ST3H, and ST3I, and also operates a switch ST3J which is in position 0 when the other decks are in the zero position, but which is in position J for all other positions of the relay ST3.

When the adding machine switch F moves into the "subtotal" position and closes relay K7, thereby closing contacts K7A, K7B, and K7C, all of these stepping relay decks are simultaneously set into motion and they step automatically and substantially continuously from position to position until the circuits are closed to the lower ends of the relays K3, K4, and K5 through decks ST1A, ST2A, ST3A, and the adding machine internal wiring. For instance, by comparing FIGS. 4 and 3, it will be seen that within the adding machine the switches G, H, and I include wipers which are respectively connected to ground. These wipers are moved around by the adding machine to particular positions. For example, when the subtotal has been run including the $2.35 entry and the 20¢ entry, switch G will be in position 2 as shown in dashed lines, switch H will be in position 5 as shown in dashed lines, and switch I will be in position 5 as shown in dashed lines, and therefore present a total of $2.55 recorded in the adding machine. As the stepper switches rotate, the wiper of switch ST1A, FIG. 4, will step around until it reaches position #2 at which time the wire leading to the bottom of relay 3 will be grounded through the adding machine switch G, and the relay K3 will be actuated, thereby opening normally-closed contacts K3A and breaking the current through the stepping relay ST1. This stepping relay then halts and remains stopped in this #2 position. Stepping relays ST2 and ST3, however, are still running. Both of them intermittently step around until they reach position #5, in which position the wipers of switches ST2A and ST3A are grounded through the adding machine switches H and I, thereby actuating relays K4 and K5 and opening normally-closed contacts K4A and K5A to halt the advance of relays ST2 and ST3.

By this means, the $2.55 subtotal entry in the adding machine has now been also recorded on the stepping relays ST1, ST2, and ST3, and all three of these relays have been halted by the energizing of the relays K3, K4, and K5.

This subtotal information is used by the stepping relays to compute the tax.

As stated above, relays K3, K4, and K5 are all energized, meaning that normally-closed contacts K3A, K4A, and K5A are now opened to stop the motion of the stepping relays, and also that K3B, K4B, and K5B are closed to energize the tax-computing decks comprising the B, C, D, E, and F decks of the stepping relays ST1 nd ST2, and the B, C, and D decks of relay ST3, and also its switch ST3J. This point will be further amplified subsequently in connection with FIG. 5.

Returning to FIG. 4, the energizing of relays 3, 4, and 5 also closes contacts K3C, K4C, and K5C, thereby connecting the upper end of relay winding K9 to ground, and closing the latter relay. When K9 closes, it also closes contact K9C which serves as a self-holding contact maintaining the relay K9 in closed condition through the normally closed contact K8A. In addition, the relay K1 is once more energized through the wire W2, see FIG. 3, and this relay waits for 50 milliseconds, then closes for the purpose presently explained.

As stated above, the closing of relays K3, K4, and K5 closes contacts K3B, K4B, and K5B, FIG. 4, and thereby connects the wire W7 to ground in order to energize the tax-computing decks of the stepping relays enumerated above. The entire tax-computing system can be seen better in FIG. 5 wherein the solenoid deck 5 has been partially repeated in order to show the manner in which the diode coupling circuits 11a on the stepper deck 11 connect the stepping switches with the solenoid deck 5 in order to enter the appropriate tax depending upon the relative arrested positions of stepping relays ST1, ST2, and ST3.

Referring to FIG. 4, the closing of the relays K3, K4, and K5 grounds the wire W7, and if a ground path can be found through the stepping switch decks and through the diode coupling circuits 11a to the left end of one or more of the solenoids on the solenoid deck 5, a path will be completed through that solenoid and from the right end thereof back through the normally-closed contact K1A, FIG. 3, to the positive terminal of the power supply, thereby actuating that relay to enter a tax value on the adding machine located thereadjacent (not shown in FIG. 5). In this manner, a tax is computed by the stepping relay decks.

To illustrate this function using the numerical example in which ST1 is in the number 2 position, ST2 is in the number 5 position, and ST3 is in the number 5 position, these values represent a total entry of $2.55 for food. Assuming a 3% tax rate, the ground current passing through line W7 is applied to deck ST3B at the number 5 terminal, see FIG. 5. Although there is a circuit extending therefrom upwardly to the deck ST2B, the current can not proceed through this circuit because the vertical wire from ST3B to ST2B is connected only to the number 2 terminal of the latter deck whereas the wiper of the switch is on the number 5 terminal. Thus, no tax is entered through any of the B-decks for the $2.55 total. Passing over to the C-decks, the current from the wire W7 can pass upwardly to the wiper of deck ST3C, through the number 5 contact thereof and then to the number 8 contact of deck ST2E. However, no current can flow through this path because the wiper is not on the 8th contact of deck ST2E. There is no circuit through the deck ST2E which is in position 5 which is a blank contact. Nor is there a circuit completed through deck ST2C from wire W7. For this reason, no current can pass through deck ST1C and therefore all of the C-deck wafers pass no current. However, the line W7 does lead directly to the number 5 position of the deck ST2D and since this switch is in the number 5 position the current can travel through the wiper and upwardly through the deck ST1D, through the wiper of that switch, into the #2 position of that switch, and from there through the diode D2 and rightwardly through the wire W8 to the number 8 solenoid of the cents group on the solenoid deck. This solenoid 8th is then actuated and immediately enters 8¢ on the adding machine. The adding machine switch F, FIG. 3, then moves to the "add" position internally within the adding machine and energizes the line leading to the relay contact K9D in FIG. 3. Since the relay K9 has been closed by the closure of the contacts K3C, K4C, and K5C, current passes through the contacts K9D and energizes the subtotal relay K14 to close the contacts K14A to thereby actuate the subtotal solenoid on the adding machine. The adding machine then adds the 8¢ tax to the $2.55 bill and prints on the recorded paper strip the total bill of $2.63 which the customer is to pay.

The actuation of the subtotal solenoid on the solenoid deck 5 does not, however, cause current to flow from the subtotal switch F internally in the adding machine through the relay K7 because the normally-closed contacts K9B are now standing open due to the fact that the relay K9 is actuated. The open contacts K9B interrupt the adding machine cycle and prevent the entire system from taking another tax on the final total. If it were not for these contacts K9B being open, the adding machine would perform a continuous function of totalizing, taxing, totalizing, taxing, etc.

The relay K1 is also energized at the same time as the relay K9 through the wire #2, thereby commencing the 50-millisecond delay interval. At the end of the 50 milliseconds, the relay K1 operates and opens the contacts K1A near the upper right-hand corner of FIG. 5, and thereby releases the solenoid which was used to enter the 8¢ tax on the adding machine. The closing of the relay K1 also closes the contact K1C and energizes the relay K2 which itself closes again at the end of an additional 50-milliseconds' delay and opens the normally-closed contacts K2A to release the subtotal solenoids on the solenoid deck.

The remaining wiring connections on the tax-computing stepper decks are such as to compute a 3% tax on whatever sum of money is entered as the subtotal of all of the items punched on the item keyboard. This subtotal is the subtotal which is entered on the entire stepper deck, and the stepper deck having been positioned to record this subtotal remains so positioned until it is moved by another entry of information which is contrary to the one already entered therein.

The functioning of the multiplicity of diodes in the diode-coupling circuits 11a is merely to make the flow of current unidirectional from any ground point to the solenoids, but so as to prevent backflow from one line coupled to a solenoid to another. For instance, considering the solenoid wire that goes to the number 8 solenoid in the cents group of the solenoid deck 5 in FIG. 5, there are three wires which go to the horizontal line connected with this solenoid. Connection of contact #2 on deck ST1D to ground actuates the #8 solenoid through diode D2, but does not return a ground connection through the other two vertical wires going to the #8 solenoid because of the fact that the diodes coupled in series with each of them blocks the back-flow of current therethrough. This is necessary to the proper functioning of the tax-computing switch decks.

At this chronological point the entire bill has been entered on the paper tape to be handed to the customer at a later time, and also the total of the bill appears on the digital display 10.

*Cash Keyboard*

With the total bill including taxes entered on the adding machine, the operator now enters on the cash keyboard the amount of cash tendered by the customer so that the system can obtain the difference between the amount of tendered cash and the total amount of the bill. At the present point in the chronological sequence of operation of the system, the total bill is entered on the adding machine and the relay K9 still remains energized, meaning that the normally-closed contact K9A in series with the "add" relay K11, FIG. 3, stands open, and that the normally-open contact K9E in series with the "subtract" relay K12 now provides a path to the winding thereof so as to close this relay whenever contact K1B closes.

The cash keyboard has three groups of keys respectively comprising keys S71 through S79 representing dollars, keys S80 through S88 representing dimes, and keys S89 through S97 representing cents. In addition, two more keys S98 and S99 are provided which respectively represent ten dollars currency or twenty dollars currency which might be tendered by a customer. It will be noted that these groups of keys are coupled directly to the solenoid deck 5 and are in fact connected in parallel with the outputs of the item-pricing programmers 4, FIG. 2.

Referring again to FIG. 3, and remembering that a total bill of $2.63 has been entered on the adding machine including tax, the amount of money tendered by the customer will at this point be entered by the operator on the cash keyboard 14. Assuming as a simple example that the customer tenders a ten-dollar bill, the switch S98 will be closed by the operator and this switch will immediately energize the ten-dollar solenoid on the solenoid deck 5. At the same time, the wire W2 connected with the relay K1 will be grounded through the diode CR98 so that at the end of the 50-millisecond delay which is a characteristic of the relay K1, the relay will close, thereby closing the contacts K1B and K1C and opening the normally-closed contact K1A. The opening of the contact K1A de-energizes the ten-dollar solenoid by breaking its return connection through wire W5 to the positive terminal of the power supply, thereby protecting this solenoid from possible overheating if the operator should forget and retain key S98 depressed for an undue length of time. The closing of the contact K1B returns the upper end of the winding of the relay K12 to ground through contact K9E, and thereby energizes this relay to close the contacts K12A and thereby energize the subtract solenoid on the solenoid deck 5. At this point, ten dollars is subtracted from $2.63 to provide a negative total of 7.37, which negative total will be printed on the paper tape by the line printer 9 and also displayed by the digital display 10. This negative total represents the amount of change which is due the customer.

At this point the operator can dispense the correct change by actuating the change switch SC on the item keyboard shown in FIG. 2. The operation of this change switch will be presently explained in greater detail, the change switch SC being connected by wire W9 to the winding of relay 13, FIG. 3.

The closing of contact K1C energizes the winding of the relay K2, which also has an inherent 50-millisecond delay, and at the end of 50 milliseconds the relay K2 operates, thereby opening normally-closed contact K2A and de-energizing the subtract solenoid on the solenoid deck 5. It will be seen that this sequence of operation of the two delay relays K1 and K2 is the same during operation of the cash keyboard as during operation of the item keyboard, the relay K1 serving to protect the solenoids representing money and also the grand-total solenoid, and the relay K2 serving to protect the "add," "subtract," "total" and "subtotal" solenoids every time a keyboard switch is closed. Also, as in the case of the item keyboard, in which diodes CR1 through CR70 serve to ground the upper end of the winding of relay K1 through the wire W2 when an associated switch is closed on the keyboard, the diodes CR71 through CR99 serve to ground the upper end the winding K1 when one or more of the cash key switches S71 through S99 is closed, no current for the line W2 being returned to ground whenever a switch corresponding with one of the cash keys is closed.

At this stage in the chronological operation of the system, the operator closes the change-dispensing switch SC on the item keyboard, FIG. 2, and thereby connects the wire W9, FIGS. 2 and 3, directly to ground. The grounding of the wire W9, FIG. 3, immediately energizes the winding K13 of the "total" relay and closes the contacts K13A to energize the "total" solenoid on the solenoid deck 5. Upon actuation of this solenoid, the adding machine switch F goes into the "total" position, and the relay K6 is energized to operate the contacts associated therewith, shown in FIG. 4. The actuation of relay K6 immediately closes the contacts K6A and K6B to energize the relays K4 and K5 which set in motion the stepper switches ST2 and ST3 representing respectively dimes and cents. The purpose of this re-actuation of the steppers ST2 and ST3 is to re-enter thereon the amount of change appearing now as the negative total in the adding machine and representing the amount of change to be dispensed automatically to the customer. The present machine dispenses only coins, but does not dispense paper money, and therefore there would be no reason to actuate the stepper ST1 by energizing the relay K3. For that reason the stepper ST1 need not be further considered, and merely remains set at whatever position it was in the last time it was used. The steppers ST2 and ST3 reposition themselves to enter the 37¢ in coinage which is now due the customer according to the negative total of $7.37 obtained by subtracting ten dollars from the $2.63 bill, including tax.

*Change Dispensing*

The relay K8 is provided with a slow release characteristic which is inherent in the relay and which provides time in which the stepper switches ST2 and ST3 can complete their search for the proper positions for the purpose of change-dispensing. As stated above, with a total bill, including tax, of $2.63 and with a tendered sum of $10, the correct change is $7.37, and it is therefore necessary for the steppers ST2 and ST3 to arrive at the 37¢ position. The relays K4 and K5 are energized through the contacts K6A and K6B.

Referring to FIG. 6, the grounded terminal on the stepper ST2 is in the fifth position. Therefore, the stepper ST2 steps around continuously from the fifth position which it was left in previously, passing through the zero position, and continues around until it reaches the third position corresponding with the present position of the adding machine switch H. Upon reaching this position, the wiper contact on deck ST2A becomes grounded and the relay K4 becomes energized therethrough.

The operation of the relay K4 also opens the normally-closed contact K4A and interrupts the stepper switch 2 in the 30¢ position.

At the same time, the stepper switch 3 is also continuously stepping around from the fifth position to which it was previously set. It steps from #5 to #6 and stops on position #7 whereat the wiper on deck ST3A becomes grounded, thereby closing the relay K5 and opening the normally-closed contact K5A. This stops the advance of stepper ST3 and leaves it set in the #7 position. Therefore, at the present time the steppers ST2 and ST3 have been advanced to a 37¢ position. When both relay contacts K4D and K5D have been closed and because of the fact that relay contact K6C is still closed, the relay K8 is actuated. The actuation of relay K8 breaks the normally-closed contacts K8A which have been holding the relay K9 closed and thereby releases the latter relay. However, when this relay is released, the contacts K9C are opened and thereby also release the relay K8. Both relays therefore open, and release the subtract relay K12 by opening the contacts K9E.

With the steppers ST2 and ST3 set on the 37¢ position, the system is now ready to dispense the correct amount of change. The coin dispenser 15 and the circuits 12 which determine the coin denominations dispensed are shown in FIG. 6, although the coin dispenser itself is shown in simplified form because it is a purchased unit the details of which form no part of the present invention. The working embodiment of the present system employs a National Cash Register Co. dispenser Model #410–1. In dispensing change, there are a great many combinations of coins which will add up to the proper amount, but it is the purpose of the coin-denomination selector to select the fewest number of coins which will add up to the required amount of change. The selection of these coins is performed by the stepper sections ST2G, ST2H, and ST2I and by the stepper decks ST3E, ST3F, ST3G, ST3H, and ST3I. In the numerical example discussed above, the second row of steppers including ST2G, ST2H, and ST2I are all set in the third position representing the 30¢. The stepper switches ST3E, ST3G, ST3H, and ST3I are all set in the #7 position representing the 7¢ change.

In the discussion above, the closing of the relay K8 was discussed in connection with FIG. 4, and this relay also includes an additional contact K8B which when closed actuates the change dispenser by completing circuits from a source of current represented by a battery B through one of the change dispenser solenoids whose circuit is completed by the stepper switch decks. For example, the wire W11 is connected to the wiper of switch decks ST2G, ST2H, ST2I, ST3I, and ST3H. Since the ST2 stepper decks are all set in the #3 position, current can only flow through decks ST2H position 3 and from there down into wire W12. This wire is connected to the wiper on deck ST3F and to the #7 contact on deck ST3E, thereby energizing both of those decks. Since the entire stepper switch ST3 is set in the #7 position, current can flow through the contact 7 on switch ST3F and up through wire W13 to actuate the second of two 10¢ solenoids which will dispense a dime. The current flowing through the wire W12 also can pass through diode D3 and into the #7 position of the stepper ST3E. From this contact it is connected both to the wiper of deck ST3E and also directly to the 25¢ solenoid in the coin dispenser through the wire W14, thereby dispensing one quarter. The machine has now dispensed 35¢ up to the present point of the discussion. The current which flows from the contact 7 on deck ST3E through the wiper of that contact flows by way of wire W15 into the contacts 7 and 2 of the deck ST2H, which contacts represent a dead end because of the fact that this switch is in position 3.

On the deck ST3I which is in position #7, a circuit is completed from the wire W11 attached to the wiper through contact #7 and from there to the second of the 2¢ dispenser solenoids via wire W16, which actuates the 2¢ dispenser solenoid, thereby bringing the total change dispensed to the correct amount, namely 37¢. Although the explanation of the coin dispenser 15 and denomination selector 12 have been in chronological order, it is to be understood that all of the coins are simultaneously selected and dispensed during the moment that the contact K8B is closed. Thus, the coin dispensing is simultaneous for all coins dispensed as distinguished from sequential as might be concluded from the above discussion.

In the inventory counter 3 there is included a transaction counter C71, one side of which is connected to wire W4 which is connected through normally-closed contacts K2A to the positive power supply terminal, so that when the upper end of the winding of counter C71 is grounded it will be advanced one position so as to maintain a count of the total number of customers. If only a single customer comes through the line he is counted automatically since during normal functioning of the machine the relay K6 is closed when the switch F on the adding machine moves to the "total" position. As this switch closes to make the total bill to be presented to the customer, its contact K6D in the upper right-hand corner of FIG. 2 closes and therefore grounds the upper end of the winding on the counter to advance the count by one person. On the other hand, if more than one person is included on a particular check, the operator can close switch S100, in the upper left-hand corner of FIG. 2, and manually advance the counter as many times as is necessary to enter the total number of people, remembering that the first person is always automatically entered by the machine into the total count of the counter C71.

The digital display 10 is coupled to the adding machine switches G, H, I and J through terminals on the adding machine and comprising a part thereof, the digital display merely comprising four illuminated number display units, each having 10 small lamps, and connected by the vertical lines shown in the digit groups in FIG. 3 with the horizontal wire outputs from said adding machine switches. Suitable numerical display units are available on the commercial market, the present system employing digital read-out units manufactured by Industrial Electronic Engineers. The digital display 10 in the present system always exhibits the values recorded by the positions of the adding machine switches G, H, I and J in plain view of both the operator of the system and the customer.

A grand-total billing for the day, or for any other service period, can be determined by the operator by depressing the "grand total" key SG in FIG. 3 to ground the wire W10 and thereby energize the relay K10, FIG. 3. The energizing of this relay closes the contacts K10A and energizes the "grand total" solenoid on solenoid deck 5. Also, K13 will be energized by the energizing of relay K10 through the diode D5 to close the contacts K13A and thereby take a total from the adding machine. As stated above, the adding machine used on the working embodiment of the present invention is a standard machine purchased from the National Cash Register Company, and is so arranged that the items which are added by the switches of the solenoid deck 5 and which represent cash values are cumulative in the machine on a cumulative register, and this register is caused to print its total whenever the "grand-total" solenoid of solenoid deck 5 is actuated. It is a characteristic of the adding machine that the amounts subtracted when actuating the cash keyboard are not deducted from the grand-total register within the machine so that the use of the machine for determining the correct amount of change does not affect the register which keeps track of the total billing. In other words, the grand-total register is only affected by values which are entered using the "add" function of the machine and is not affected by values using the "subtract" function of the machine. In this manner, by simply pressing the "grand-total" key SG appearing near the lower lefthand corner of FIG. 2, the operator can obtain instantaneously the total billing for the day, or for any other desired interval of time.

A tax accumulator 13 can be added to the present system, as shown in the diagram of FIG. 5 by providing a small adding machine which is coupled to the diode-coupling circuits 11a and operated only when the present system is performing the function of adding an accumulated tax to the total bill to keep an accurate total of all of the tax amounts which have been collected during the service period.

The present invention is not to be limited to the precise embodiment shown in the drawings, for obviously changes may be made therein within the scope of the following claims.

We claim:
1. A register system comprising
(a) an adding machine having keys for entering, sub-totalling, totalling and subtracting dollars, dimes and cents, and having mechanically positioned means for each decimal order and each positioned means defining ten positions for instantaneously representing the digital content of the adding machine;
(b) key actuator means superposed above the adding machine for selectively operating its keys when the actuator means is energized;
(c) keyboard means connected to selectively energize the actuator means, and the keyboard means including means for operating the sub-totalling key;
(d) first and second banks of decade switches corresponding with each decimal order and both banks in each order being coupled to one of said positioned means to follow the digital content of the adding machine;
(e) first circuit means for determining a tax amount according to a predetermined tax rate and comprising multiple paths wired through some of the switches in each first bank and connected to energize said actuator means selectively according to the positions of the switches when the adding machine is registering a subtotal as a consequence of operating said subtotalling key, and said first circuit means energizing said actuator means to operate the totalling key to add the tax and the subtotal to form a total;

(f) means coupled to said actuator means for energizing the keys of the machine to enter an amount of cash tendered, and including means for operating said subtracting key to obtain on the adding machine a difference representing change due;

(g) change dispenser means having individual denomination delivering means; and (h) second circuit means for determining change denominations and comprising multiple paths wired through others of the switches in each second bank and connected to energize said denomination delivering means selectively according to the positions of the switches when the adding machine is registering said difference as a consequence of operating said subtracting key.

2. In a system as set forth in claim 1, said decade switches comprising stepping relays having ten-position relay-advancing means coupled with the said positions of the adding machine to maintain the relays always in the same positions as the corresponding mechanically positioned means.

3. In a system as set forth in claim 2, said key actuator means comprising a plurality of solenoids each positioned to actuate a key of the adding machine; and said system including timing means connected in common with said solenoids for breaking the flow of current therethrough a fixed time interval after a solenoid has been energized, and said timing means commencing said time interval each time a solenoid is energized.

4. In a system as set forth in claim 1, said keyboard means having item keys corresponding with items for sale; item-pricing means interposed between said keyboard means and said key actuator means, and each pricing means including multiple position switch means for each decimal order and connected with all of the digital actuator means in that order and further including switch wiper means adjustable to complete the connection between an item key of the keyboard means and selected ones of said actuator means in the several decimal orders.

5. In a system as set forth in claim 4, an item counter connected with each item key and advanced when the item key is operated.

6. In combination with a conventional adding machine having keys for entering, sub-totalling, totalling and subtracting dollars, dimes and cents, and having mechanically positioned means for each decimal order and each positioned means including ten positions for instantaneously representing the digital content of the adding machine; external means cooperating with the adding machine to provide a register system, comprising:

(a) key actuator means superposed above the adding machine for selectively operating its keys when the actuator means is energized;

(b) keyboard means connected to said actuator means to selectively enerigze the said means, and the keyboard means including means for operating the sub-totalling key;

(c) first and second multiple-path circuit means corresponding with each decimal order and including path selecting means in each order, each selecting means being coupled with the ten positions of that order to selectively energize paths through the circuit means corresponding with various digital amounts registered on the adding machine;

(d) said first circuit means determining a tax amount according to a predetermined tax rate and comprising paths interwiring some of said selecting means in each decimal order and connected to energize said actuator means selectively according to the positions of said positioned means when the adding machine is registering a subtotal as a consequence of operating said sub-totalling key, and said first circuit means including means for energizing said actuator means to operate the totalling key to add the tax and the subtotal to form a total;

(e) means coupled to said actuator means for energizing the keys of the machine to enter an amount of cash tendered, and including means for operating said subtracting key to obtain on the adding machine a difference representing change due;

(f) change dispenser means having individual denomination delivering means; and (g) said second circuit means determining change denominations and comprising paths interwiring others of said selecting means in each decimal order and connected to energize said denomination delivering means selectively according to the positions of said positioned means when the adding machine is registering said difference as a consequence of operating said subtracting key.

7. In a system as set forth in claim 6, said path selecting means comprising stepping relays having ten-position relay-advancing means coupled with said positions of the adding machine to manitain the relays always in the same positions as the corresponding mechanically positioned means.

8. In a system as set forth in claim 7, said key actuator means comprising a plurality of solenoids each positioned to actuate a key of the adding machine; and said system including timing means connected in common with said solenoids for breaking the flow of current therethrough a fixed time interval after a solenoid has been energized, and said timing means commencing said time interval each time a solenoid is energized.

9. In a system as set forth in claim 6, said keyboard means having item keys corresponding with items for sale; item-pricing means interposed between said keyboard means and said key actuator means, and each pricing means including multiple position switch means for each decimal order and connected with all of the digital actuator means in that order and further including switch wiper means adjustable to complete the connection between an item key of the keyboard means and selected ones of said actuator means in the several decimal orders.

10. In a system as set forth in claim 9, an item counter connected with each item key and advanced when the item key is operated.

References Cited in the file of this patent

UNITED STATES PATENTS

| | | |
|---|---|---|
| 2,014,432 | Gerhold | Sept. 17, 1935 |
| 2,332,304 | Davies | Oct. 19, 1943 |
| 2,798,665 | Moser | July 9, 1957 |
| 2,805,675 | Noyes | Sept. 10, 1957 |
| 2,805,821 | Spurlino | Sept. 10, 1957 |
| 2,970,756 | Spesock et al. | Feb. 7, 1961 |
| 2,972,442 | Goodbar | Feb. 21, 1961 |
| 3,003,694 | Oxley et al. | Oct. 10, 1961 |
| 3,034,717 | Werner | May 15, 1962 |
| 3,049,289 | Borutzke et al. | Aug. 14, 1962 |
| 3,061,184 | Becker | Oct. 30, 1962 |